(12) United States Patent
Kobayashi

(10) Patent No.: US 10,395,487 B2
(45) Date of Patent: Aug. 27, 2019

(54) HAPTIC PRESENTATION APPARATUS, RECOGNITION APPARATUS, CONTROL APPARATUS, AND HAPTIC PRESENTATION METHOD

(71) Applicant: SONY CORPORATION, Tokyo (JP)

(72) Inventor: Toshiyuki Kobayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/778,660

(22) PCT Filed: Sep. 20, 2016

(86) PCT No.: PCT/JP2016/004279
§ 371 (c)(1),
(2) Date: May 24, 2018

(87) PCT Pub. No.: WO2017/094211
PCT Pub. Date: Jun. 8, 2017

(65) Prior Publication Data
US 2019/0005781 A1     Jan. 3, 2019

(30) Foreign Application Priority Data

Dec. 4, 2015  (JP) .................................. 2015-237114

(51) Int. Cl.
*H04B 3/36* (2006.01)
*G08B 6/00* (2006.01)
(Continued)

(52) U.S. Cl.
CPC ........... *G08B 6/00* (2013.01); *G01C 21/3652* (2013.01); *G06F 1/325* (2013.01); *G06F 1/3231* (2013.01); *G06F 3/016* (2013.01)

(58) Field of Classification Search
CPC ......... G08B 6/00; G06F 1/3231; G06F 1/325; G06F 3/016; G01C 21/3652
(Continued)

(56) References Cited

U.S. PATENT DOCUMENTS 6,262,712 B1   7/2001  Osborne et al.
2009/0076723 A1   3/2009  Moloney
(Continued)

FOREIGN PATENT DOCUMENTS

CN     102609186 A    7/2012
HK       1171840 A1   6/2017
(Continued)

OTHER PUBLICATIONS

International Search Report and Written Opinion of PCT Application No. PCT/JP2016/004279, dated Nov. 1, 2016, 10 pages of ISRWO.

(Continued)

*Primary Examiner* — Tanmay K Shah
(74) *Attorney, Agent, or Firm* — Chip Law Group

(57) ABSTRACT

A haptic presentation apparatus includes an actuator mechanism, a transmission mechanism, a detection unit, and a recognition unit. The transmission mechanism is configured to transmit haptic information to a user using a driving force caused by the actuator mechanism. The detection unit is configured to detect a load amount applied to the actuator mechanism. The recognition unit is configured to recognize a contact state of the user with respect to the transmission mechanism on the basis of the load amount detected by the detection unit.

13 Claims, 6 Drawing Sheets

(51) Int. Cl.
*G01C 21/36* (2006.01)
*G06F 3/01* (2006.01)
*G06F 1/3231* (2019.01)
*G06F 1/3234* (2019.01)

(58) Field of Classification Search
USPC ..................................................... 340/407.1
See application file for complete search history.

(56) References Cited

U.S. PATENT DOCUMENTS

| | | | | |
|---|---|---|---|---|
| 2009/0289779 | A1* | 11/2009 | Braun | G06F 3/016 340/407.2 |
| 2011/0260990 | A1* | 10/2011 | Ali | G06F 3/016 345/173 |
| 2012/0056825 | A1* | 3/2012 | Ramsay | G06F 3/0488 345/173 |
| 2012/0151339 | A1 | 6/2012 | Zhang et al. | |
| 2013/0076649 | A1* | 3/2013 | Myers | H04M 1/0268 345/173 |
| 2013/0229088 | A1* | 9/2013 | Jung | G06F 3/016 310/317 |
| 2017/0311086 | A1* | 10/2017 | Ishii | H04R 7/04 |

FOREIGN PATENT DOCUMENTS

| | | | |
|---|---|---|---|
| JP | 11-212725 | A | 8/1999 |
| JP | 11212725 | A * | 8/1999 |
| JP | 2001-211239 | A | 8/2001 |
| JP | 2013-145589 | A | 7/2013 |
| JP | 2015-203893 | A | 11/2015 |

OTHER PUBLICATIONS

Extended European Search Report of EP Patent Application No. 16870154.8, dated Nov. 9, 2018, 08 pages.

* cited by examiner

HAPTIC PRESENTATION APPARATUS, RECOGNITION APPARATUS, CONTROL APPARATUS, AND HAPTIC PRESENTATION METHOD

CROSS REFERENCE TO RELATED APPLICATIONS

This application is a U.S. National Phase of International Patent Application No. PCT/JP2016/004279 filed on Sep. 20, 2016 which claims priority benefit of Japanese Patent Application No. JP 2015-237114 filed in the Japan Patent Office on Dec. 4, 2015. Each of the above-referenced applications is hereby incorporated herein by reference in its entirety.

TECHNICAL FIELD

The present technology relates to a technology of a haptic presentation apparatus that presents a force including a tactile sense to a user.

BACKGROUND ART

Patent Literature 1 discloses a device that provides a realistic feeling of an object by transmitting a reaction force from a virtual object to a user in games or virtual reality experiences. For example, this device uses a pressure sensor and a myoelectric sensor to detect a strength with which the user grips the device and how fingers are tightened. This device improves reproducibility of a tactile haptic sense by using correction data indicating individual differences, that is generated from a comparison between an illusionary tactile haptic sense induction function and characteristics of the illusionary tactile haptic sense of each user (see, for example, paragraphs [0043] and [0071] in specification of Patent Literature 1).

Patent Literature 2 discloses a technology of a cellular phone to which a game function that allows a user to swing a cellular phone like a maracas in accordance with a rhythm of a musical piece reproduced by the cellular phone, is added. In this technology, when the user causes the cellular phone to vibrate in a state where power of a vibration motor of the cellular phone is turned off, a counter electromotive force is generated in the vibration motor. A CPU of the cellular phone detects the vibration given by the user by detecting that counter electromotive force (see, for example, paragraphs [0015] and [0019] in specification of Patent Literature 2).

CITATION LIST

Patent Literature

Patent Literature 1: Japanese Patent Application Laid-open No. 2013-145589
Patent Literature 2: Japanese Patent Application Laid-open No. 2001-211239

DISCLOSURE OF INVENTION

Technical Problem

In the haptic presentation apparatus, for example, in order to surely transmit haptic information to the user, there are situations where it is necessary to accurately detect a contact state of the user with respect to the apparatus.

An object of the present disclosure is to provide a technology of a haptic presentation apparatus and the like with which a contact state of a user with respect to the apparatus can be detected accurately.

Solution to Problem

To attain the object described above, a haptic presentation apparatus according to an embodiment of the present technology includes an actuator mechanism, a transmission mechanism, a detection unit, and a recognition unit.

The transmission mechanism is configured to transmit haptic information to a user using a driving force caused by the actuator mechanism.

The detection unit is configured to detect a load amount applied to the actuator mechanism.

The recognition unit is configured to recognize a contact state of the user with respect to the transmission mechanism on a basis of the load amount detected by the detection unit.

In this haptic presentation apparatus according to the present technology, since the contact state of the user with respect to the transmission mechanism is recognized on the basis of the load amount of the actuator mechanism that generates a driving force for presenting a force to the user, the contact state can be recognized accurately.

The haptic presentation apparatus may further include a control unit configured to control drive of the actuator mechanism on a basis of the contact state recognized by the recognition unit.

Accordingly, the haptic presentation apparatus can present different haptic information to the user in accordance with the contact state of the user.

The actuator mechanism may include a plurality of actuators, and the control unit may be configured to selectively switch drive of the plurality of actuators in accordance with the contact state. Alternatively, the transmission mechanism may include a plurality of transmission units that function as movable portions respectively configuring a part of the plurality of actuators.

With these technologies, it is possible to present a plurality of pieces of different haptic information, that is, various types of haptic information, to the user.

At least one of the plurality of actuators may output a vibration having a frequency of 50 Hz or more and 400 Hz or less.

In this way, by setting the vibration frequency within a range where a human perception sensitivity to vibrations is high, it becomes possible to present highly-efficient haptic information and also enhance an effect of selectively using a plurality of actuators.

The actuator mechanism may include one actuator, and the control unit may be configured to generate different driving states of the actuator in accordance with the contact state. Alternatively, the transmission mechanism may include a plurality of transmission units that are configured to respectively transmit haptic information corresponding to the different driving states.

With these technologies, it becomes possible to present various types of haptic information to the user on the basis of a plurality of different driving states.

The control unit may be configured to control the drive of the actuator mechanism while as least one of the different driving states is a vibration having a frequency of 50 Hz or more and 400 Hz or less.

The recognition unit may be configured to measure, as the load amount, a counter electromotive voltage, driving current, rotation speed, or temperature of the actuator mechanism.

Accordingly, the contact state can be recognized accurately.

The haptic presentation apparatus may further include a casing that accommodates the actuator mechanism, and the transmission mechanism may form at least a part of the casing.

The actuator mechanism may include at least one of an eccentric motor, a linear resonant actuator, a piezoelectric actuator, and a magnetostrictive actuator.

A recognition apparatus according to the present technology is a recognition apparatus for a haptic presentation apparatus including an actuator mechanism. The recognition apparatus includes a recognition unit configured to detect a load amount applied to the actuator mechanism and recognize, on a basis of the load amount, a contact state of a user with respect to a transmission mechanism configured to transmit haptic information to the user using a driving force caused by the actuator mechanism.

A haptic presentation method executed by the haptic presentation apparatus, according to an embodiment of the present technology, includes transmitting, by the transmission mechanism, haptic information to a user using a driving force caused by the actuator mechanism.

By the detection unit, a load amount applied to the actuator mechanism is detected.

By the recognition unit, a contact state of the user with respect to the transmission mechanism is recognized on a basis of the load amount detected by the detection unit.

A haptic presentation apparatus according to another embodiment of the present technology includes a plurality of actuators and a control unit.

The plurality of actuators are configured to respectively generate driving forces corresponding to different driving states.

The control unit is configured to recognize a contact state of a user with respect to the haptic presentation apparatus and selectively switch drive of the plurality of actuators in accordance with the recognized contact state.

By the control unit selectively switching the actuator to be driven in accordance with the contact state of the user with respect to the haptic presentation apparatus, various types of haptic information based on a plurality of different driving states can be presented to the user. A control apparatus according to the present technology includes a control unit configured to recognize a contact state of a user with respect to a haptic presentation apparatus and selectively switch drive of a plurality of actuators that respectively generate driving forces corresponding to different driving states in accordance with the recognized contact state.

A haptic presentation method for a haptic presentation apparatus according to another embodiment of the present technology includes recognizing, by a control unit of the haptic presentation apparatus including a plurality of actuators that respectively generate driving forces corresponding to different driving states, a contact state of a user with respect to the haptic presentation apparatus.

By the control unit, drive of the plurality of actuators is selectively switched in accordance with the recognized contact state.

Advantageous Effects of Invention

As described above, according to the present technology, a contact state of a user with respect to an apparatus can be detected accurately.

It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

1. Configuration of Haptic Presentation Apparatus

In this specification, several configurations of a haptic presentation apparatus will first be described with reference to the block diagrams, and application examples of that haptic presentation apparatus will be described after that.

1.1) Configuration Example 1

Figure 1:
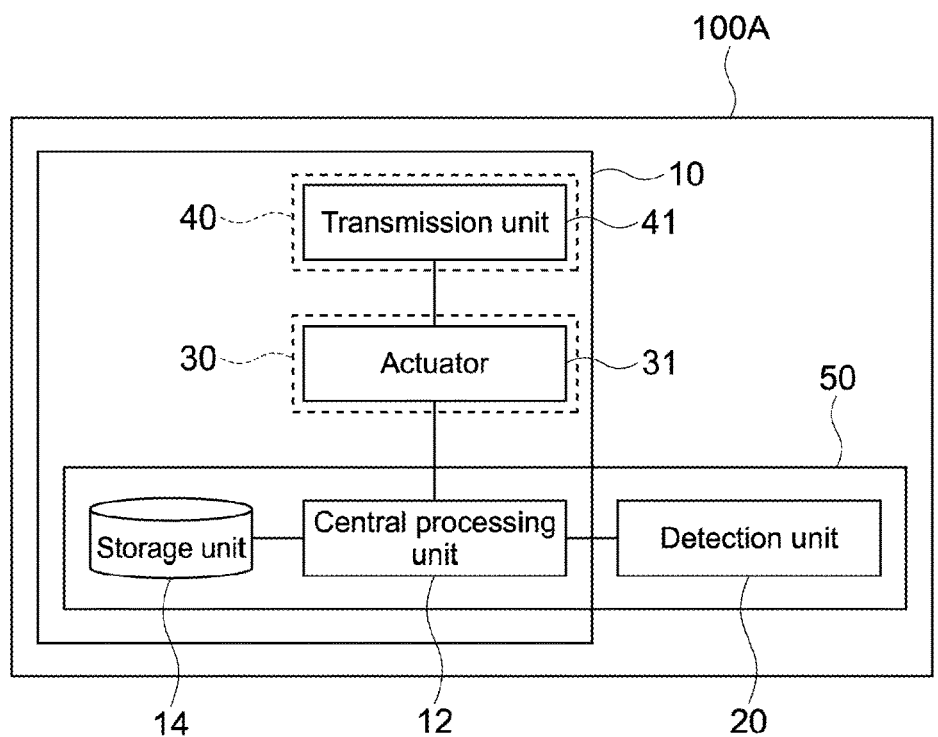
FIG. 1 is a block diagram showing a configuration of a haptic presentation apparatus according to Configuration Example 1 of the present technology.

FIG. 1 is a block diagram showing a configuration of a haptic presentation apparatus according to Configuration Example 1 of the present technology. A haptic presentation apparatus 100A is mainly applicable to portable electronic apparatuses such as a smartphone, a tablet terminal, an electronic book, and an electronic notebook, though is not necessarily limited to the portable type. Alternatively, the haptic presentation apparatus 100A can be used as a dedicated apparatus that presents haptic information.

The haptic presentation apparatus 100A includes a haptic information output unit 10 and a detection unit 20. The haptic information output unit 10 mainly includes a central processing unit 12, a storage unit 14, an actuator mechanism 30, and a transmission mechanism 40.

Hardware of the central processing unit 12 is constituted of a CPU (Central Processing Unit), an MPU (Micro Processing Unit), a PLD (Programmable Logic Device), or the like. In addition to these elements, the hardware of the central processing unit 12 may include a DSP (Digital Signal Processor) or the like.

A program requisite for realizing the present technology is stored in the storage unit 14. Typically, the central processing unit 12 is configured to execute processing in cooperation with the program stored in the storage unit 14. The storage unit 14 is constituted of a well-known storage device such as a volatile and/or nonvolatile device. The central processing unit 12 and the storage unit 14 may be physically integrated.

The actuator mechanism 30 includes, for example, one actuator 31. A driving state of the actuator 31 is controlled by the central processing unit 12.

The driving state mainly refers to a driving force and its generation direction and corresponds to haptic information that is generated by the central processing unit 12 and output from the actuator mechanism 30. The driving state may include a driving time, a driving cycle, or the like in addition to the elements described above. In a case where the actuator 31 is an actuator that generates a vibration (including audio), the driving state refers to states of an amplitude, cycle, phase, and combination pattern of these for realizing the driving force and its generation direction.

The "haptic sense" is mainly a force that a person receives from an object when touching the object (herein, haptic presentation apparatus 100A). The "haptic sense" also conceptually includes a "tactile sense" and also a concept of perceiving an illusional force as in a virtual haptic sense, an illusional haptic sense, and the like. As means for realizing the illusional haptic sense, for example, a biased acceleration vibration to be described later can be used.

As the actuator mechanism 30 (actuator 31), an electromagnetic actuator or a non-electromagnetic actuator can be used.

The electromagnetic actuator is an actuator that uses an electromagnetic force as a driving force. Examples of the electromagnetic actuator include a rotary motor and a linear motor. The rotary motor includes, for example, an eccentric motor (ERM: Eccentric Rotating Motor). The linear motor includes, for example, a voice coil motor (VCM: Voice Coil Motor), a linear resonant actuator (LRA: Linear Resonant Actuator), and a magnetostrictive actuator.

The non-electromagnetic actuator is an actuator other than the electromagnetic actuator. Examples of the non-electromagnetic actuator include a piezoelectric actuator, an actuator that uses a shape-memory alloy, and a polymer actuator.

The transmission mechanism 40 includes, for example, one transmission unit 41. The transmission unit 41 is configured to transmit, using a driving force generated by the actuator 31, haptic information corresponding to that driving force (driving state) to the user. Typically, the transmission unit 41 is configured as a movable portion (mover) forming a part of the actuator 31. As an example, in a case where the actuator 31 is an ERM, the movable portion is a weight. The transmission unit 41 may be constituted of at least a part of a casing of the haptic presentation apparatus 100A. In this case, elements of the actuator 31 other than the movable portion drive the transmission unit which is at least a part of the casing, by a movement of a center of gravity, an inertia force, and the like.

The detection unit 20 is configured such that the central processing unit 12 detects information for recognizing a contact state of the user with respect to the haptic presentation apparatus 100A (e.g., casing).

Examples of a detection amount to be detected by the detection unit 20 include a voltage, a current, a rotation speed, a pressure, a shear stress, an acceleration, an angular velocity, a position, a contact (contact position, contact force, or contact area), a magnetic field, an electric field, a humidity, a temperature, a light absorption amount, a light reflection amount, an image, and a sound pressure level (environmental sound etc.). The detection unit 20 only needs to include a sensor capable of detecting these parameters.

As the detection amount to be obtained by the detection unit 20, there is biological information of a user, for example. Examples of the biological information of the user include a magnetoencephalography, an electroencephalogram, a myoelectric voltage (or current), an electrocardiographic voltage (or current), a heart rate, and the like. In addition to these, a pulse wave, body temperature, and the like of the user may also be used as the biological information of the user.

A casing (not shown) accommodates the central processing unit 12, the storage unit 14, and the actuator mechanism 30. The detection unit 20 may be accommodated in the casing, may be provided outside the casing, or both. The casing may be configured as a part of the actuator mechanism 30.

In the haptic presentation apparatus 100A configured as described above, the central processing unit 12 recognizes a contact state of the user with respect to the haptic presentation apparatus 100A (e.g., casing) on the basis of the information detected by the detection unit 20. In this case, the central processing unit 12, the storage unit 14, and the detection unit 20 function as a recognition unit 50 (recognition apparatus).

Further, the central processing unit 12 is configured to control drive of the actuator mechanism 30 on the basis of the recognized contact state of the user. In this case, the central processing unit 12 mainly functions as a control unit (control apparatus). Haptic presentation apparatuses 100B, 100C, 100D, and 100E according to Configuration Examples 2 to 5 to be described later also basically perform the operations described above.

For example, in a case where an acceleration and/or angular velocity are/is used as the detection amount to be detected by the detection unit 20, when the detected acceleration and/or angular velocity are/is equal to or larger than a threshold value (or equal to or smaller than threshold value), are/is within a predetermined range, or have/has a predetermined cyclic pattern, the central processing unit 12 can judge that the user is in contact with the haptic presentation apparatus 100A.

For example, in a case where the biological information of the user is used as the detection amount to be detected by the detection unit 20, the central processing unit 12 executes processing as follows. The central processing unit 12 judges that the user is in contact with the haptic presentation apparatus 100A in a case where a magnetoencephalography, electroencephalogram, myoelectric voltage (or current), electrocardiographic voltage (or current), heart rate, pulse wave, and/or body temperature are/is equal to or larger than a threshold value (or equal to or smaller than threshold value), are/is within a predetermined range, or have/has a predetermined cyclic pattern.

More detailed operation (application example) of the haptic presentation apparatus 100A will be described later.

1.2) Configuration Example 2

Figure 2:
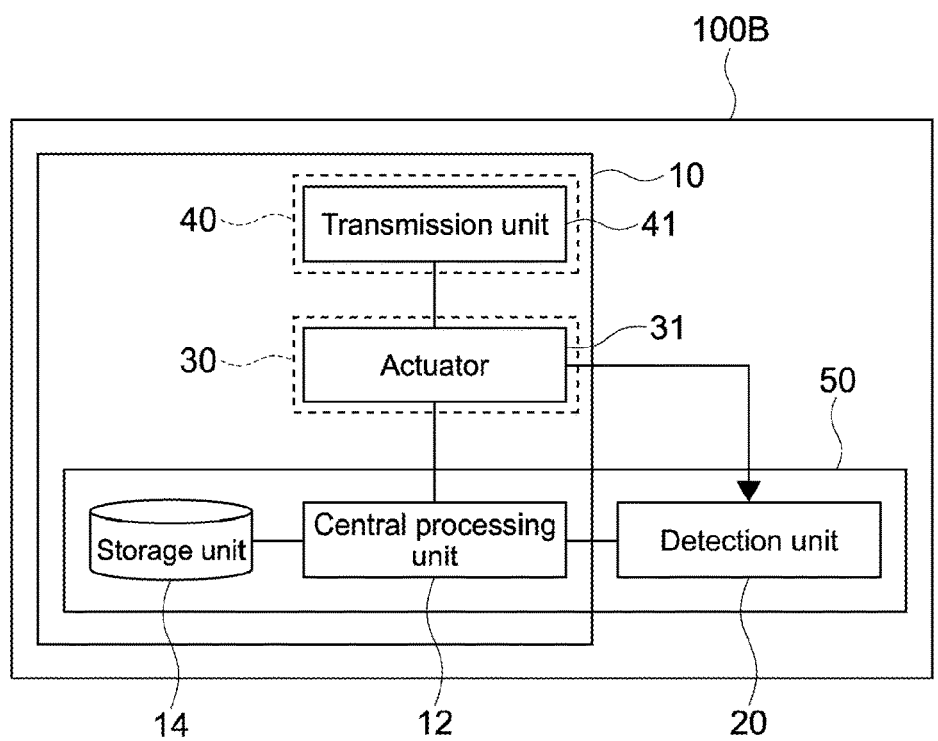
FIG. 2 is a block diagram showing a configuration of a haptic presentation apparatus according to Configuration Example 2 of the present technology.

FIG. 2 is a block diagram showing a configuration of a haptic presentation apparatus according to Configuration Example 2 of the present technology. In descriptions below, elements including members, functions, and the like substantially similar to those of the haptic presentation apparatus 100A according to Configuration Example 1 above are denoted by the same symbols, descriptions thereof will be simplified or omitted, and different points will mainly be described.

In this haptic presentation apparatus 100B, the detection unit 20 is configured to detect a load amount applied to the actuator mechanism 30. For example, in a case where the actuator 31 is an electromagnetic actuator, the detection unit 20 detects a counter electromotive voltage as a voltage or a driving current (in a case of constant voltage drive) as a current, to thus detect that load amount. In a case where the electromagnetic actuator is a rotary motor, the detection unit 20 can detect a rotation speed of the rotary motor using, for example, a Hall element or a rotary encoder. Alternatively, the detection unit 20 may detect a temperature of the actuator 31. The central processing unit 12 can calculate (convert) these counter electromotive voltage, driving current, rotation speed, or temperature as the load amount applied to the actuator mechanism 30.

When the user touches the transmission unit 41 to which the driving force of the actuator 31 is transmitted while the actuator 31 is being driven, a load is applied to the actuator 31. In this Configuration Example 2, the detection unit 20 detects the load amount applied to the actuator 31 at this time, and the central processing unit 12 recognizes the contact state of the user with respect to the transmission unit 41 on the basis of the load amount detected by the detection unit 20. In a case where the load amount is equal to or larger than a threshold value (or equal to or smaller than threshold value) or is within a predetermined range, or in a case where the load amount fluctuates regularly, for example, the central processing unit 12 can judge that the user is in contact with the haptic presentation apparatus 100B.

For example, a case where an eccentric motor (ERM: Eccentric Rotating Motor) is used as the actuator 31, and the eccentric motor causes the transmission unit 41 to vibrate, to thus present (transmit) a haptic sense will be assumed. In this case, when the user touches the transmission unit 41, a mass of an object connected to the movable portion of the actuator 31 increases, so a displacement amount of the center of gravity of the object is suppressed, and a vibration thereof is suppressed, with the result that the load is reduced, and a current value is lowered.

Alternatively, a case where a rotary motor is used as the actuator 31, and the rotary motor rotates the transmission unit 41 as a rotating body, to thus present (transmit) a haptic sense will be assumed. In this case, the load increases when the user touches the transmission unit 41, and the current value increases.

Here, the load amount increases or decreases even when objects other than the user come into contact, but in such a case, since the transmission unit 41 pushes that object away, the load fluctuates temporally irregularly. In contrast, in a case where the user intentionally touches the transmission unit 41, a hand or fingers follows/follow the transmission unit 41, so the load amount shows a regular pattern. Therefore, the contact state can be recognized by using an appropriate algorithm, machine learning, and the like.

More favorably, for recognizing the contact state of the user, the haptic presentation apparatus 100B can adopt a driving method for the actuator 31 suited for recognizing a contact state. Specifically, this is a dedicated actuator driving method for recognizing the contact state of the user. For example, by using a method of repeating drive and a measurement of a driving current (or counter electromotive voltage) for each vibration cycle, or the like, highly-accurate recognition can be made in a short time.

In order to further improve recognition accuracy regarding the contact state of the user with respect to the transmission unit 41, it is also possible to use a sensor that detects the pressure described above and a sensor that detects biological information at the same time. Alternatively, as described in "Journal of Information Processing Society of Japan Vol. 52, No. 2 571-584 (2011)", it is also possible to adopt or use in combination a method of measuring a vibration waveform obtained by the actuator 31 by an acceleration sensor and recognizing a contact state from that vibration waveform and a power spectrum.

By detecting the load amount of the actuator 31 as described above, the central processing unit 12 can detect a pushing degree of the user with respect to the transmission unit 41. Therefore, the contact state of the user can be recognized accurately. Further, in addition to this, by detecting pressure distribution information and the biological information of the user, the recognition accuracy is further improved.

1.3) Configuration Example 3

Figure 3:
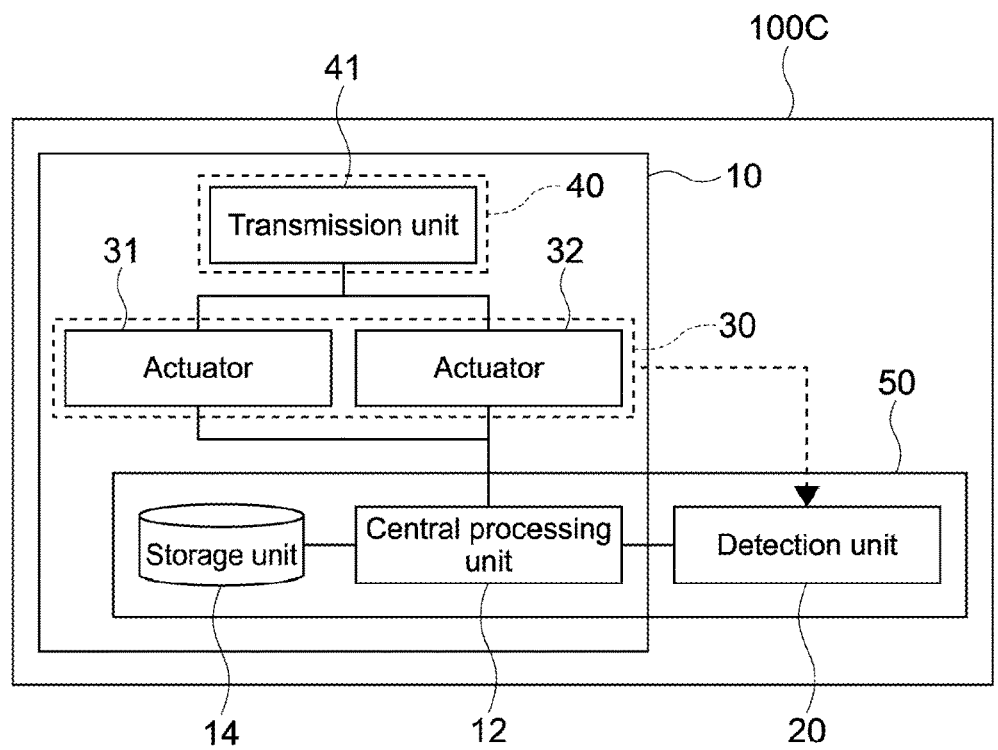
FIG. 3 is a block diagram showing a configuration of a haptic presentation apparatus according to Configuration Example 3 of the present technology.

FIG. 3 is a block diagram showing a configuration of a haptic presentation apparatus according to Configuration Example 3 of the present technology. The actuator mechanism 30 of this haptic presentation apparatus 100C includes a plurality of actuators. Here, the actuator mechanism 30 includes two actuators 31 and 32 that are connected to one transmission unit 41. There may be 3 or more actuators.

The central processing unit 12 (control unit) selectively switches drive by the plurality of actuators 31 and 32 in accordance with the recognized contact state of the user with respect to the haptic presentation apparatus 100C (e.g., casing). Specifically, the central processing unit 12 selects the actuator to be driven in accordance with the recognized contact state out of the actuators 31 and 32, and controls a driving state of the selected actuator. Accordingly, various types of haptic information based on a plurality of different driving states can be presented to the user.

It should be noted that the central processing unit 12 can also control the driving states of the plurality of actuators 31 and 32 to be the same driving state simultaneously or non-simultaneously.

In Configuration Example 3, the detection unit 20 may detect the load amount applied to the actuator mechanism 30 (at least one of plurality of actuators 31 and 32) as described in Configuration Example 2. In the figure, a flow of information fed back from the actuator mechanism 30 to the detection unit 20 is indicated by an arrow in a broken line. The same holds true for Configuration Example 4 and subsequent embodiments below.

The storage unit 14 only needs to store a relationship between the detection value obtained by the detection unit 20 and the load amount applied to the actuator mechanism 30 as a lookup table, for example. Alternatively, the storage unit 14 only needs to store an arithmetic expression that expresses the relationship between the detection value and the load amount.

1.4) Configuration Example 4

Figure 4:
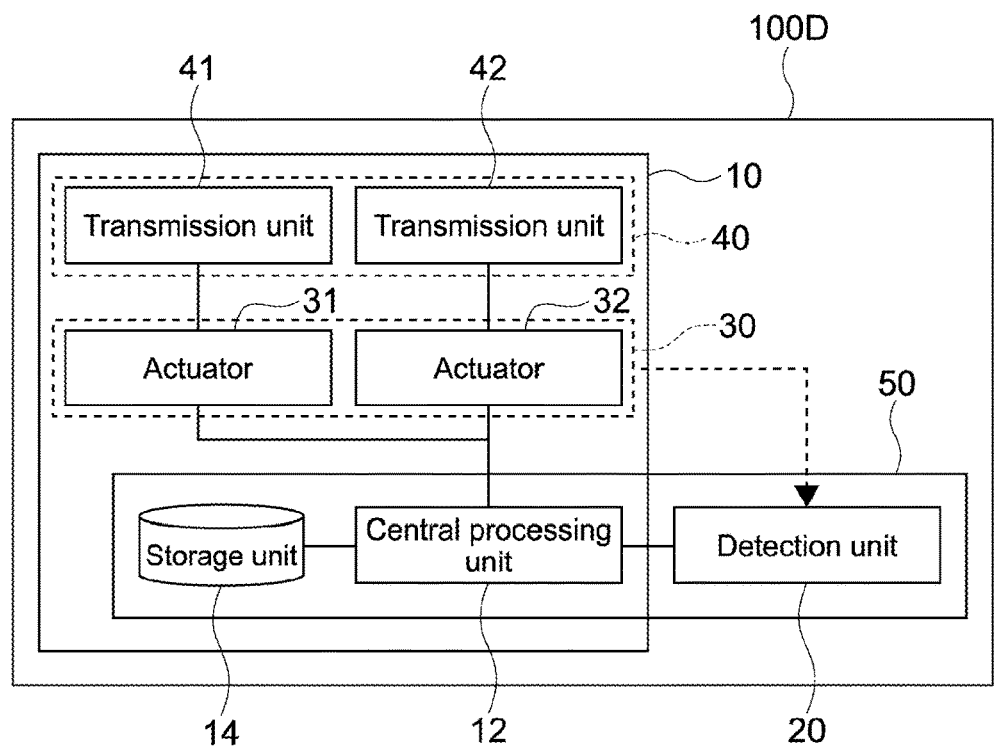
FIG. 4 is a block diagram showing a configuration of a haptic presentation apparatus according to Configuration Example 4 of the present technology.

FIG. 4 is a block diagram showing a configuration of a haptic presentation apparatus according to Configuration Example 4 of the present technology. The transmission mechanism 40 of this haptic presentation apparatus 100D includes a plurality of transmission units 41 and 42, and the transmission units (41, 42) are respectively provided for the actuators (31, 32). The transmission unit 41 is connected to the actuator 31, and the transmission unit 42 is connected to the actuator 32. The actuator 31 transmits a driving force to the transmission unit 41, and the actuator 32 transmits a driving force to the transmission unit 42. 3 or more actuators and 3 or more transmission units may be provided.

The central processing unit 12 (control unit) selectively switches the drive by the plurality of actuators 31 and 32 in accordance with the contact state of the user with respect to the haptic presentation apparatus 100D (transmission unit 41 or casing). Specifically, the central processing unit 12 selects the actuator to be driven in accordance with the recognized contact state out of the plurality of actuators 31 and 32, and controls a driving state of the selected actuator. As a result, haptic information corresponding to that driving state is presented from the transmission unit connected to the selected actuator out of the transmission units 41 and 42. In Configuration Example 4, various types of haptic information based on a plurality of different driving states can be presented to the user as in Configuration Example 3.

1.5) Configuration Example 5

Figure 5:
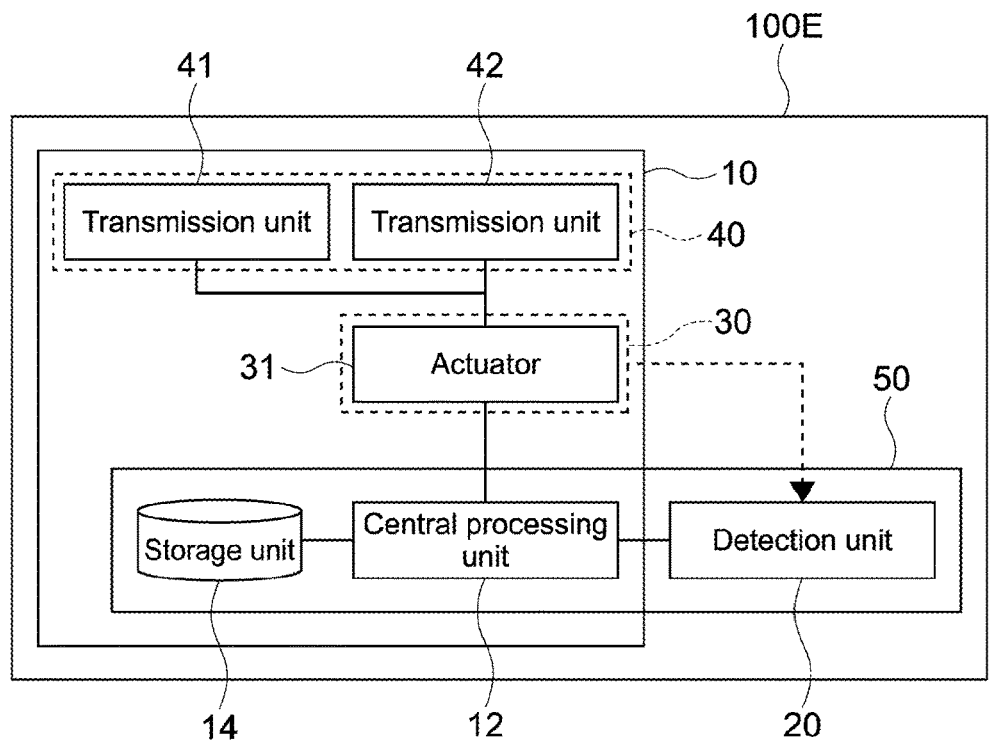
FIG. 5 is a block diagram showing a configuration of a haptic presentation apparatus according to Configuration Example 5 of the present technology.

FIG. 5 is a block diagram showing a configuration of a haptic presentation apparatus according to Configuration Example 5 of the present technology. The actuator mechanism 30 of this haptic presentation apparatus 100E includes one actuator 31 that is connected to the plurality of (e.g., two) transmission units 41 and 42.

The central processing unit 12 (control unit) controls drive of the actuator 31 such that one actuator 31 transmits different haptic information to the transmission units 41 and 42 at different timings. Specifically, the central processing unit 12 controls the drive of the actuator 31 such that one actuator 31 generates different driving states in accordance with the contact state of the user with respect to the haptic presentation apparatus 100E (transmission unit 41 or casing). In Configuration Example 5, various types of haptic information based on the driving states having different numbers can be presented to the user as in Configuration Examples 3 and 4.

2. Application Example of Haptic Presentation Apparatus 2.1) Application Example 1

Figure 6:
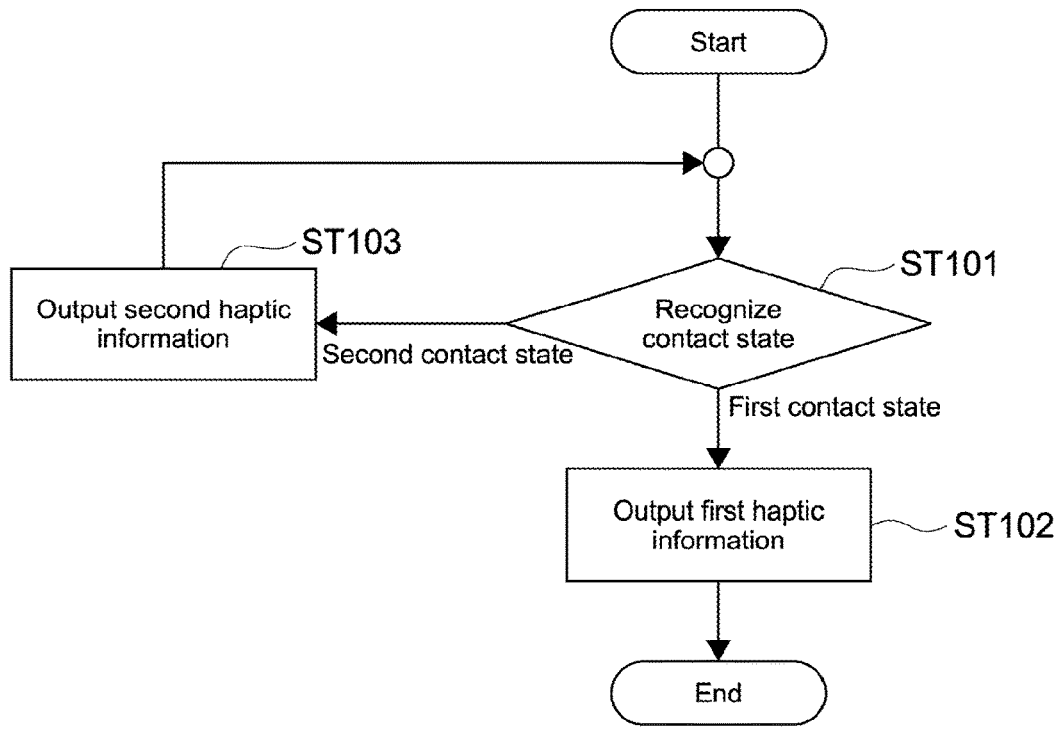
FIG. 6 is a flowchart showing, as Application Example 1, a basic operation of the haptic presentation apparatus according to Configuration Example 3, 4, or 5 above.

FIG. 6 is a flowchart showing, as Application Example 1, basic operations carried out by the haptic presentation apparatus 100C, 100D, or 100E according to Configuration Example 3, 4, or 5 out of Configuration Examples 1 to 5 described above.

The central processing unit 12 detects the contact state of the user with respect to the haptic presentation apparatus (transmission unit 41 or casing) by the detection unit 20 (Step 101). The central processing unit 12 judges which of a first contact state and a second contact state the contact state is, and outputs first haptic information (Step 102) or outputs second haptic information different from the first haptic information (Step 103) in accordance with the judgment result. Specifically, the central processing unit 12 presents haptic information corresponding to one of the different driving states using one or more actuators 31 in accordance with the contact state.

As a distinction between the first contact state and the second contact state, for example, there are a normal contact state (favorable contact state) and an abnormal contact state (unfavorable contact state). The abnormal contact state conceptually includes a non-contact state. For example, the first haptic information is output in the first contact state, and the second haptic information is output in the second contact state.

Alternatively, as the distinction between the first contact state and the second contact state, whether the user is gripping the haptic presentation apparatus in a predetermined way may be used.

The central processing unit 12 may preset 3 or more contact states and output haptic information corresponding to 3 or more driving states in accordance with those 3 or more contact states. For example, the central processing unit 12 can judge the 3 contact states in a case where the detection values of the detection unit 20 are sorted to 3 or more ranges or patterns.

For example, in the case of the abnormal contact state, the central processing unit 12 outputs haptic information that prompts the user to make a normal contact. By repetitively recognizing the contact state until the contact state of the user becomes normal, the central processing unit 12 can cause the user to come into contact with the haptic presentation apparatus in a normal contact state, and accurately present haptic information to be output after that, to the user.

For example, as the abnormal contact state, there may be a case where the user is carrying the haptic presentation apparatus in a pocket of his/her clothes or in a bag. In this case, even if a driving force is generated in the transmission unit 41, the user may not be able to perceive it. Therefore, outputting the second haptic information accordingly is a typical purpose of the processing shown in FIG. 6. In general, it is known that a human perception sensitivity to vibrations of 50 Hz or more and 400 Hz or less is high. Therefore, in a case where the actuator 31 is a vibration motor (e.g., eccentric motor, piezoelectric actuator, etc.), a driving state of the actuator 31 that causes a vibration of 50 Hz to 400 Hz can be used as the second haptic information.

The central processing unit 12 may output third haptic information different from the first or second haptic information at a stage before recognizing the contact state of the user. Specifically, this third haptic information is haptic information for executing the processing of recognizing the contact state of the user in Step 101.

2.2) Application Example 2

Figure 7:
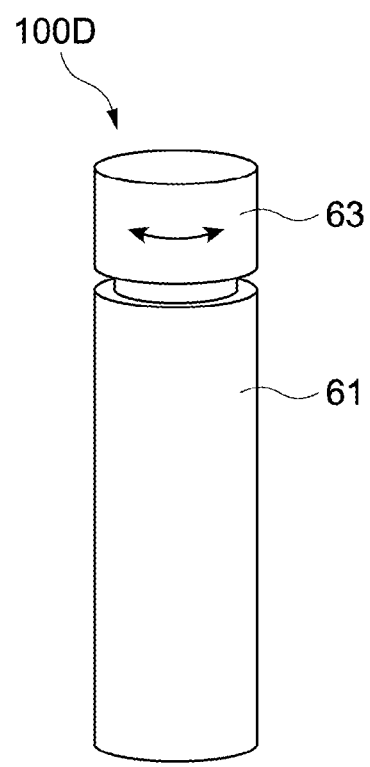
FIG. 7 is a perspective view showing, as Application Example 2, a specific application example of the haptic presentation apparatus according to Configuration Example 4 above.

FIG. 7 is a perspective view showing, as Application Example 2, a specific application example of the haptic presentation apparatus 100D according to Configuration Example 4 shown in FIG. 4. The haptic presentation apparatus 100D includes a casing 61 and a rotating body 63. The casing 61 and the rotating body 63 each function as the transmission mechanism 40, that is, the transmission unit 41. The actuator mechanism 30 includes the actuator 31 that rotates the rotating body 63 and the actuator 32 that causes a grip portion to vibrate. A rotary motor is used as the actuator 31, for example. For example, an ERM is used as the actuator 32.

The user can grip the grip portion by his/her hand and touch the rotating body 63 with a finger (e.g., thumb). When the user presses the finger against the rotating body 63, the finger moves in a right-hand direction along with a rightward rotation of the rotating body 63, and the finger moves in a left-hand direction along with a leftward rotation. Accordingly, the user can intuitively perceive the direction by making the rotation direction correspond to a guidance direction.

Figure 8:
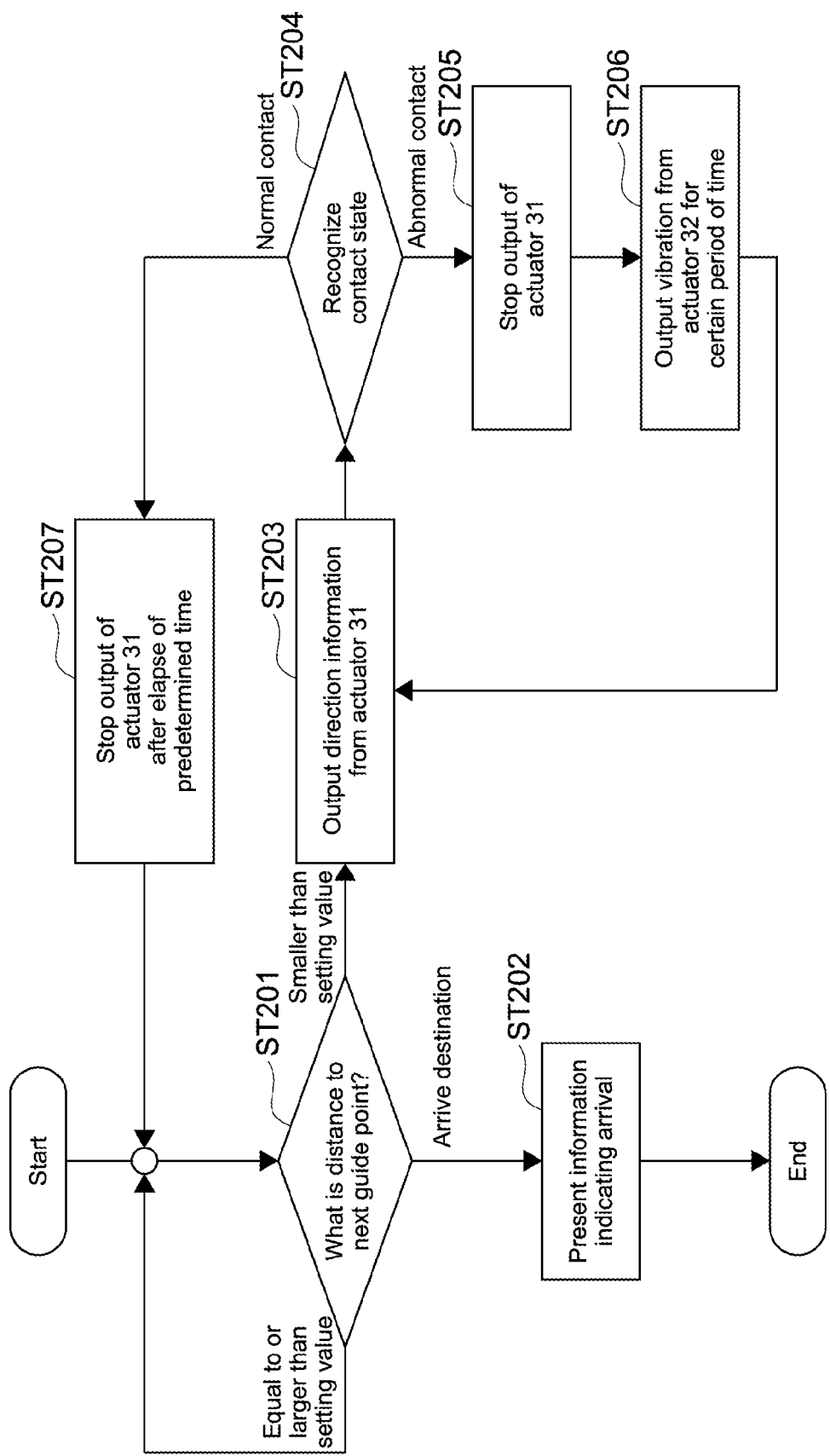
FIG. 8 is a flowchart showing processing carried out by the haptic presentation apparatus according to Application Example 2.

FIG. 8 is a flowchart showing processing carried out by the haptic presentation apparatus 100D according to the Application Example 2. This flowchart shows processing of a walking navigation of the user using this haptic presentation apparatus 100D. In this example, the haptic presentation apparatus 100D or a portable apparatus (not shown) connectable to this haptic presentation apparatus 100D in a wired or wireless manner includes a global position sensor. Examples of a global position measurement system include a GPS (Global Positioning System), GLONASS (Global Navigation Satellite System), GNSS (Global Navigation Satellite System), and the like.

The central processing unit 12 measures a distance between the current position of the haptic presentation apparatus 100D and the next guide point (Step 201). In a case where the user arrives at the destination, the central processing unit 12 presents information indicating the arrival (Step 202). The information indicating the arrival may be haptic information or information that uses images and audio.

In a case where the distance between the current position and the next guide point is smaller than a setting value in Step 201, the central processing unit 12 rotates the rotating body 63 by the actuator 31 and presents direction information by a haptic sense (Step 203).

In Step 203, the central processing unit 12 measures a driving current of the actuator 31 by the detection unit 20 (detects load amount) during the process of the rotation operation by the rotating body 63, and recognizes the contact state between the user and the rotating body 63 (Step 204). Instead of the driving current, a counter electromotive voltage, a rotation speed of the rotating body 63, or a temperature of the actuator 31 may be used as the amount to be measured (amount to be detected).

In a case where the contact state is normal, the central processing unit 12 stops the output of the actuator 31 after an elapse of a predetermined time (Step 207), and returns to the processing of Step 201. For example, in a case where the measured current is equal to or larger than a threshold value and increases with a rotation angle of the rotating body 63 or this state continues periodically for a predetermined time, the central processing unit 12 judges that the contact state of the user is normal. In this normal contact state, a palm-side of the thumb of the user is in contact with the rotating body 63.

For example, in a case where the measured current does not take the above value, the central processing unit 12 judges that the contact state of the user is abnormal and proceeds to processing of Step 205. In Step 205, the central processing unit 12 stops the output of the actuator 31 and drives the actuator 32, to thus output vibrations for a certain period of time via the casing 61. In this way, the central processing unit 12 selectively switches the drive by the actuators 31 and 32 in accordance with the contact state of the user.

In Step 206, for example, a vibration of 50 Hz or more and 400 Hz or less, for example, a vibration of about 200 Hz, is output by the actuator 32 as described above. After that, regarding the operation of recognizing the contact state, the central processing unit 12 repeats the processing of Steps 203 to 206 until a normal contact state of the user is obtained. As described above, even if the user is not always in contact with the rotating body 63 or even if the haptic presentation apparatus 100D is carried in a pocket or a bag depending on circumstances, it is possible to surely guide the user to the destination by prompting the user to make a normal contact with the haptic presentation apparatus 100D.

2.3) Application Example 3

Figure 9:
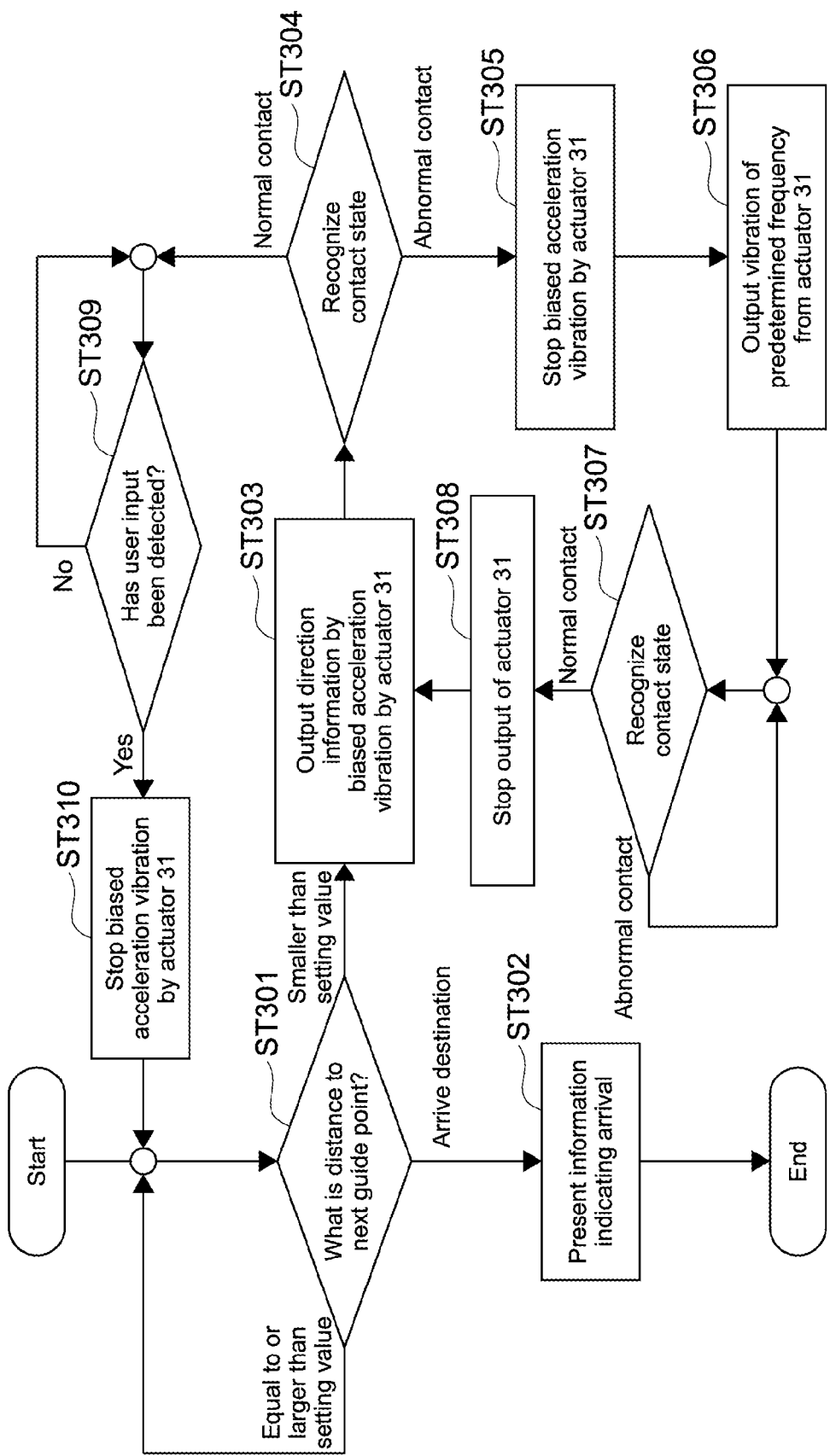
FIG. 9 is a flowchart showing processing carried out by the haptic presentation apparatus according to Application Example 3.

FIG. 9 is a flowchart showing processing carried out by a haptic presentation apparatus according to Application Example 3. This processing mainly shows processing of a walking navigation of the user using the haptic presentation apparatus 100E according to Configuration Example 5 shown in FIG. 5. Here, a compact apparatus that can be grabbed by the user with a hand or pinched by fingers is used.

Steps 301 and 302 are the same processing as Steps 201 and 202 shown in FIG. 8. In Step 303, in a case where the distance between the current position and the next guide point is smaller than the setting value, the central processing unit 12 outputs a biased acceleration vibration from the actuator 31 as haptic information.

In a case where there is spatial asymmetry in the vibration acceleration, a biased acceleration vibration occurs. For example, in a translational movement of an inertial load (m), a difference (a1–a2) is set between a maximum acceleration (a1) on an outward path and a maximum acceleration (a2) on a return path. In this case, it is considered that since it is difficult to perceive a weak force (e.g., m*a1) and easy to perceive a strong force (e.g., m*a2) due to nonlinearity of human senses, a person feels as if he/she is being pushed in one direction.

Such a biased acceleration vibration is realized by one or a plurality of piezoelectric actuators, one or a plurality of LRAs, or a plurality of ERMs. In a case where a plurality of actuators are used, Configuration Example 3 shown in FIG. 3 is used as the haptic presentation apparatus. Alternatively, a dedicated special actuator such as a pseudo haptic generation apparatus disclosed in WO 07/086426 may be used. A piezoelectric actuator or an LRA is favorable for miniaturizing the haptic presentation apparatus, raising energy use efficiency, and obtaining a desired vibration frequency.

It should be noted that in the descriptions on the processing shown in FIG. 9, the processing carried out by the haptic presentation apparatus 100E according to Configuration Example 5 will be described.

Due to the output of the biased acceleration vibration of the actuator 31 as described above, a biased acceleration vibration is caused in the entire casing (not shown) of the haptic presentation apparatus 100E. By the output of the biased acceleration vibration, the haptic presentation apparatus 100E can present haptic information in a specific direction to the user as navigation information (Step 303).

In Step 304, the detection unit 20 measures a driving current (may be counter electromotive voltage etc.) of the actuator 31. The central processing unit 12 recognizes a contact state of the user on the basis of the measured driving current.

In a case where it is judged in Step 304 that the contact state of the user is normal, the central processing unit 12 judges whether a predetermined input from the user has been detected by the detection unit 20 (Step 309). In a case where it is judged that a predetermined input from the user has been detected, the central processing unit 12 stops the output of that biased acceleration vibration (Step 310). The processing of Steps 309 and 310 is carried out for the purpose of saving energy consumption of the haptic presentation apparatus or preventing the user from feeling uncomfortable in a case where the user notices the output of the haptic sense due to the biased acceleration vibration in Step 303, for example.

As the predetermined input from the user to be detected by the detection unit 20, an input of hard keys such as buttons, a touch on a touch panel, a pressure distribution change due to the user gripping the haptic presentation apparatus 100E, a load fluctuation or a fluctuation of an acceleration or the like due to a shake of the haptic presentation apparatus 100E, an audio input, or the like only needs to be used. The predetermined input from the user becomes a condition for stopping the biased acceleration vibration (Step 310).

The following conditions may also be added as the condition for stopping the biased acceleration vibration. Examples of the conditions include an elapse of a certain time since a normal contact is judged in Step 304 (or after predetermined input of user is detected in Step 309), detecting a fact that a current path is a correct path, detecting that a guide point has passed, and the like.

In a case where it is judged in Step 304 that the contact state of the user is abnormal, the central processing unit 12 stops the output of the biased acceleration vibration by the actuator 31 (Step 305). Then, the central processing unit 12 outputs a vibration by the actuator 31 (Step 306). Similar to Step 206 of FIG. 8, the vibration herein is a vibration of 50 Hz or more and 400 Hz or less, which can be easily perceived by a person. The vibration of 200 Hz is more desirable.

After the vibration by the actuator 31 is output, the central processing unit 12 executes processing that is similar to that of Step 304 again (Step 307). When the normal contact state is recognized in Step 307, the central processing unit 12 stops the output of the vibration by the actuator 31 (Step 308) and returns to the processing of Step 303.

In this way, in this Application Example 2, the central processing unit 12 generates different driving states of the actuator 31 in accordance with the contact state of the user.

It should be noted that the processing carried out by the haptic presentation apparatus 100E according to Configuration Example 5 has been described in this Application Example 2. Alternatively, the haptic presentation apparatus 100C including, as the transmission mechanism 40, one transmission unit 41 instead of the plurality of transmission units 41, as in Configuration Example 3, may be used. Alternatively, the haptic presentation apparatus 100D including the plurality of actuators 31 and 32 as in Configuration Example 4 may be used.

3. Conclusion

As described above, since the haptic presentation apparatus can accurately recognize the contact state of the user, accurate haptic information based on that contact state can be presented to the user.

Further, since the contact state can be recognized accurately, information can be surely transmitted by prompting the user to make a correct contact by vibrations or audio in a non-contact state (abnormal contact state). In addition, since the contact state can be recognized accurately, it is possible to reduce information transmission errors in which the user has not receive information while recognizing that the haptic presentation apparatus has transmitted the information.

Since the contact state can be recognized accurately, it is possible to minimize a time for presenting a haptic sense, which requires large energy consumption. By outputting a vibration of 50 Hz or more and 400 Hz or less, which is easy to be perceived, in the abnormal contact state, highly-efficient haptic information transmission becomes possible. In the case of generating a vibration of 50 Hz or more and 400 Hz or less, power consumption can be additionally suppressed by switching to the actuator 31 that uses an LRA or the like having excellent energy efficiency.

By detecting the load amount of the actuator, other sensors such as an acceleration sensor and a pressure sensor for detecting a contact state become unnecessary. As a result, it becomes possible to reduce the size and weight of the haptic presentation apparatus and also realize cost reduction.

4. Various Other Embodiments

The present technology is not limited to the embodiments described above, and various other embodiments can be realized.

For example, the respective steps shown in FIG. 8 and the respective steps shown in FIG. 9 may be exchanged or combined as appropriate.

The haptic information is not limited to the periodic vibration and the biased acceleration vibration described above. For example, an aperiodic impact, an angular momentum change of a rotating body, a rotational movement, a translational movement, expansion and compression/contraction, a bending deformation movement, and the like may be used.

The target of haptic information (what haptic information refers to) is not limited to the direction of the walking navigation described above. For example, an alarm, a time, a speed, a position, a shop, sightseeing, a sign, a language, an emotion, a status, information in a game, an eyesight, an auditory sense, and the like may be used.

Besides the navigation apparatus described above, a gaming machine, a virtual reality environment generation apparatus, and the like may be used as the haptic presentation apparatus.

At least two of the feature portions according to the present technology described above can be combined.

It should be noted that the present technology can also take the following configurations.

(1) A haptic presentation apparatus, including:
  an actuator mechanism;
  a transmission mechanism configured to transmit haptic information to a user using a driving force caused by the actuator mechanism;
  a detection unit configured to detect a load amount applied to the actuator mechanism; and
  a recognition unit configured to recognize a contact state of the user with respect to the transmission mechanism on a basis of the load amount detected by the detection unit.

(2) The haptic presentation apparatus according to (1), further including
  a control unit configured to control drive of the actuator mechanism on a basis of the contact state recognized by the recognition unit.

(3) The haptic presentation apparatus according to (2), in which
  the actuator mechanism includes a plurality of actuators, and
  the control unit is configured to selectively switch drive of the plurality of actuators in accordance with the contact state.

(4) The haptic presentation apparatus according to (3), in which
  the transmission mechanism includes a plurality of transmission units that function as movable portions respectively configuring a part of the plurality of actuators.

(5) The haptic presentation apparatus according to (3) or (4), in which
  at least one of the plurality of actuators outputs a vibration having a frequency of 50 Hz or more and 400 Hz or less.

(6) The haptic presentation apparatus according to (2), in which
  the actuator mechanism includes one actuator, and the control unit is configured to generate different driving states of the actuator in accordance with the contact state.

(7) The haptic presentation apparatus according to (6), in which the transmission mechanism includes a plurality of transmission units that are configured to respectively transmit haptic information corresponding to the different driving states.

(8) The haptic presentation apparatus according to (6) or (7), in which the control unit is configured to control the drive of the actuator mechanism while as least one of the different driving states is a vibration having a frequency of 50 Hz or more and 400 Hz or less.

(9) The haptic presentation apparatus according to any one of (1) to (8), in which the recognition unit is configured to measure, as the load amount, a counter electromotive voltage, driving current, rotation speed, or temperature of the actuator mechanism.

(10) The haptic presentation apparatus according to any one of (1) to (9), further including a casing that accommodates the actuator mechanism, in which the transmission mechanism forms at least a part of the casing.

(11) The haptic presentation apparatus according to any one of (1) to (10), in which the actuator mechanism includes at least one of an eccentric motor, a linear resonant actuator, a piezoelectric actuator, and a magnetostrictive actuator.

(12) A recognition apparatus for a haptic presentation apparatus including an actuator mechanism, including a recognition unit configured to detect a load amount applied to the actuator mechanism and recognize, on a basis of the load amount, a contact state of a user with respect to a transmission mechanism configured to transmit haptic information to the user using a driving force caused by the actuator mechanism.

(13) A haptic presentation method executed by a haptic presentation apparatus, including:

transmitting, by a transmission mechanism of the haptic presentation apparatus, haptic information to a user using a driving force caused by an actuator mechanism of the haptic presentation apparatus;

detecting, by a detection unit of the haptic presentation apparatus, a load amount applied to the actuator mechanism; and recognizing, by a recognition unit of the haptic presentation apparatus, a contact state of the user with respect to the transmission mechanism on a basis of the load amount detected by the detection unit.

(14) A haptic presentation apparatus, including:

a plurality of actuators configured to respectively generate driving forces corresponding to different driving states; and a control unit configured to recognize a contact state of a user with respect to the haptic presentation apparatus and selectively switch drive of the plurality of actuators in accordance with the recognized contact state.

(15) A control apparatus, including a control unit configured to recognize a contact state of a user with respect to a haptic presentation apparatus and selectively switch drive of a plurality of actuators that respectively generate driving forces corresponding to different driving states in accordance with the recognized contact state.

(16) A haptic presentation method for a haptic presentation apparatus, including:

recognizing, by a control unit of the haptic presentation apparatus including a plurality of actuators that respectively generate driving forces corresponding to different driving states, a contact state of a user with respect to the haptic presentation apparatus; and selectively switching, by the control unit, drive of the plurality of actuators in accordance with the recognized contact state.

REFERENCE SIGNS LIST 12 central processing unit
14 storage unit
20 detection unit
30 actuator mechanism
31, 32 actuator
40 transmission mechanism
41, 42 transmission unit
50 recognition unit
61 casing
63 rotating body
100A, 100B, 100C, 100D, 100E haptic presentation apparatus

The invention claimed is:

1. A haptic presentation apparatus, comprising:
   an actuator mechanism that includes a plurality of actuators;
   a transmission mechanism configured to transmit haptic information to a user that utilizes a driving force caused by the actuator mechanism;
   a detection unit configured to detect a load amount applied to the actuator mechanism;
   a recognition unit configured to recognize a contact state of the user with respect to the transmission mechanism based on the load amount detected by the detection unit; and
   a control unit configured to:
      determine whether the contact state is one of normal or abnormal,
      stop an output of a first actuator of the plurality of actuators, after elapse of a threshold period of time, based on the determination that the contact state is normal, and
      stop the output of the first actuator and drive a second actuator of the plurality of actuators based on the determination that the contact state is abnormal, wherein the second actuator is driven until the contact state changes from abnormal to normal.

2. The haptic presentation apparatus according to claim 1, wherein
   the transmission mechanism includes a plurality of transmission units that function as movable portions to respectively configure a part of the plurality of actuators.

3. The haptic presentation apparatus according to claim 1, wherein
   at least one of the plurality of actuators is configured to output a vibration having a frequency in a range of 50 Hz to 400 Hz.

4. The haptic presentation apparatus according to claim 1, wherein
   the transmission mechanism includes a plurality of transmission units that are configured to respectively transmit haptic information corresponding to different driving states of the plurality of actuators.

5. The haptic presentation apparatus according to claim 1, wherein at least one of different driving states of the plurality of actuators is a vibration having a frequency in a range of 50 Hz to 400 Hz.

6. The haptic presentation apparatus according to claim 1, wherein
the recognition unit is further configured to measure, as the load amount, one of a counter electromotive voltage, driving current, rotation speed, or temperature of the actuator mechanism.

7. The haptic presentation apparatus according to claim 1, further comprising
a casing that accommodates the actuator mechanism, wherein the transmission mechanism is at least a part of the casing.

8. The haptic presentation apparatus according to claim 1, wherein
the actuator mechanism includes at least one of an eccentric motor, a linear resonant actuator, a piezoelectric actuator, or a magnetostrictive actuator.

9. A recognition apparatus, including:
an actuator mechanism, comprising:
a recognition unit configured to:
detect a load amount applied to the actuator mechanism; and
recognize, based on the load amount, a contact state of a user with respect to a transmission mechanism, wherein the transmission mechanism is configured to transmit haptic information to the user that utilizes a driving force caused by the actuator mechanism; and
a control unit configured to:
determine whether the contact state is one of normal or abnormal, and
stop an output of a first actuator of the actuator mechanism, after elapse of a threshold period of time, based on the determination that the contact state is normal, and
stop the output of the first actuator and drive a second actuator of the actuator mechanism based on the determination that the contact state is abnormal, wherein the second actuator is driven until the contact state changes from abnormal to normal.

10. A haptic presentation method, comprising:
in a haptic presentation apparatus:
transmitting, by a transmission mechanism of the haptic presentation apparatus, haptic information to a user using a driving force caused by an actuator mechanism of the haptic presentation apparatus;
detecting, by a detection unit of the haptic presentation apparatus, a load amount applied to the actuator mechanism;
recognizing, by a recognition unit of the haptic presentation apparatus, a contact state of the user with respect to the transmission mechanism based on the load amount detected by the detection unit;
determining, by a control unit of the haptic presentation apparatus, whether the contact state is one of normal or abnormal;
stopping, by the control unit, an output of a first actuator of the actuator mechanism, after elapse of a threshold period of time, based on the determination that the contact state is normal; and
stopping, by the control unit, the output of the first actuator and driving a second actuator of the actuator mechanism based on the determination that the contact state is abnormal, wherein the second actuator is driven until the contact state changes from abnormal to normal.

11. A haptic presentation apparatus, comprising:
a plurality of actuators configured to respectively generate driving forces corresponding to different driving states; and
a control unit configured to:
recognize a contact state of a user with respect to the haptic presentation apparatus,
determine whether the contact state is one of normal or abnormal,
stop an output of a first actuator of the plurality of actuators, after elapse of a threshold period of time, based on the determination that the contact state is normal, and
stop the output of the first actuator and drive a second actuator of the plurality of actuators based on the determination that the contact state is abnormal, wherein the second actuator is driven until the contact state changes from abnormal to normal.

12. A control apparatus, comprising
a control unit configured to:
recognize a contact state of a user with respect to a haptic presentation apparatus;
determine whether the contact state is one of normal or abnormal;
stop an output of a first actuator of a plurality of actuators, after elapse of a threshold period of time, based on the determination that the contact state is normal; and
stop the output of the first actuator and drive a second actuator of the plurality of actuators based on the determination that the contact state is abnormal, wherein the second actuator is driven until the contact state changes from abnormal to normal.

13. A haptic presentation method, comprising:
in a haptic presentation apparatus:
recognizing, by a control unit of the haptic presentation apparatus including a plurality of actuators that respectively generate driving forces corresponding to different driving states, a contact state of a user with respect to the haptic presentation apparatus;
determining, by the control unit, whether the contact state is one of normal or abnormal;
stopping, by the control unit, an output of a first actuator of the plurality of actuators, after elapse of a threshold period of time, based on the determination that the contact state is normal; and
stopping, by the control unit, the output of the first actuator and driving a second actuator of the plurality of actuators based on the determination that the contact state is abnormal, wherein the second actuator is driven until the contact state changes from abnormal to normal.

* * * * *